June 14, 1966 C. F. AULT 3,255,622
PARITY CHECKING CIRCUIT
Filed Dec. 22, 1961
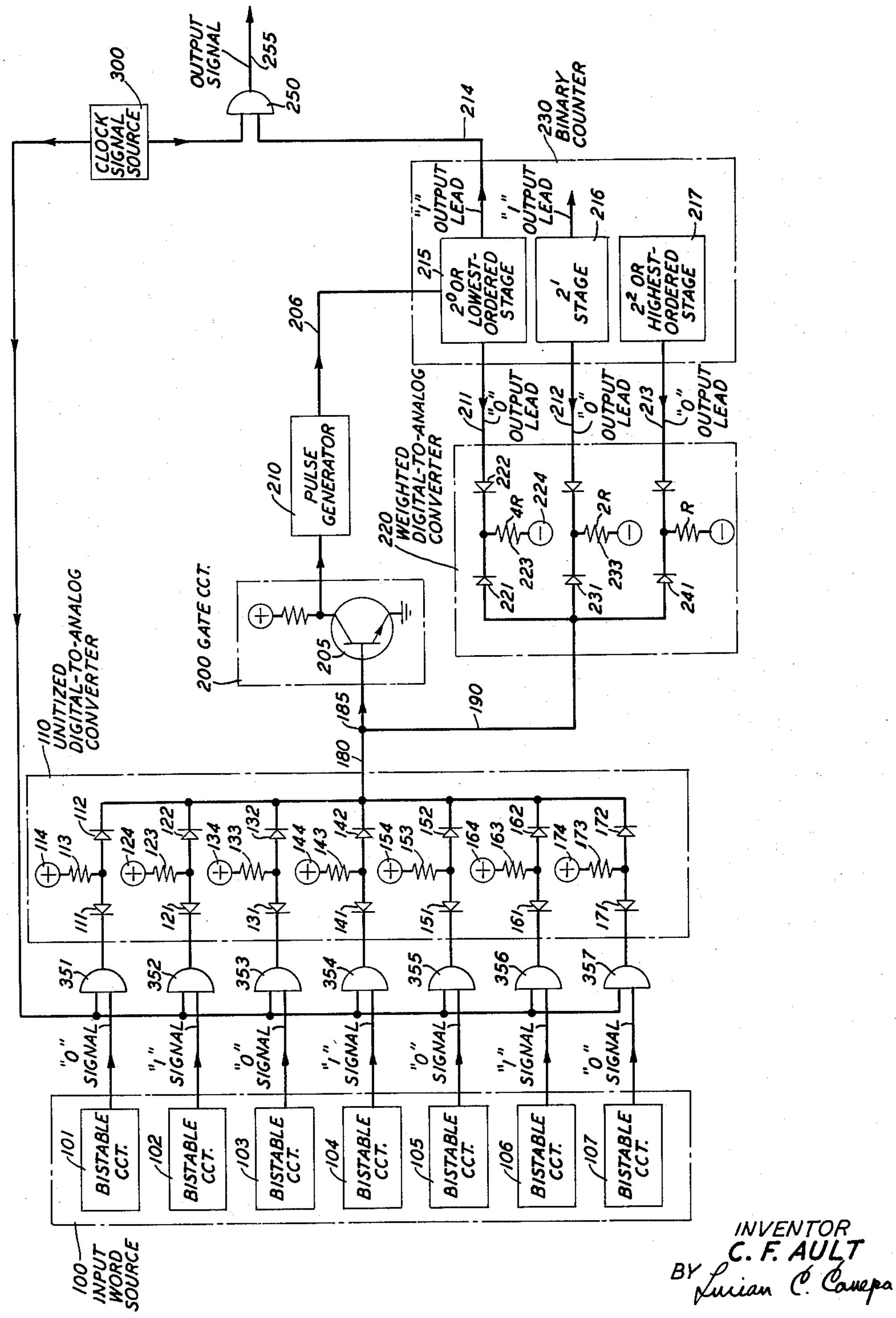
INVENTOR
C. F. AULT
BY Lucian C. Canepa
ATTORNEY 3,255,622
Patented June 14, 1966

3,255,622

PARITY CHECKING CIRCUIT

Cyrus F. Ault, Lincroft, N.J., assignor to Bell Telephone Laboratories, Incorporated, New York, N.Y., a corporation of New York Filed Dec. 22, 1961, Ser. No. 161,568
8 Claims. (Cl. 235—153)

This invention relates to the processing of digital information, and more particularly to a circuit for checking the parity of a binary word.

If, in a code composed of binary bits, a single error in a bit combination or word can produce another word which is also in the code scheme, the error cannot in general be detected. In order to detect the presence of a single error in the bits of a word, it is necessary that the code be such that at least two changes must be made in the bits of a word when changing from one word representation to any other allowable one in the code. The changing of any one of the bits in a code combination will then result in a word which can be recognized as being erroneous, and the code is therefore known as an error detecting one.

One simple expedient that is effective to add error detecting capabilities to a code is to modify each word of the code by adding thereto an extra bit which consistently makes the number of "1's" in each modified word either odd or even. Thus, if the extra or redundant bit added to each word is determined on the basis of always making the number of "1's" in the word odd, it is said that the redundant word is characterized by odd parity. Similarly, if the redundant bit is added so as to make the number of "1's" in each word even, the redundant word is said to have been formed in accordance with an even parity relationship.

Whether or not a parity scheme will be embodied in a particular digital information processing system depends, among other things, on the simplicity and reliability of the circuitry by which the parity relationship established therein can be checked to determine whether an error has occurred in a word.

An object of the present invention is the improvement of digital information processing circuits. More specifically, it is an object of this invention to provide improved parity checking circuits.

Another object of the present invention is to provide parity checking circuits which are characterized by simplicity of design and reliability.

These and other objects of the present invention are realized in a specific illustrative parity checking circuit embodiment thereof that includes a digital-to-analog converter to which are applied the bits of the word whose parity is to be checked. The converter translates the binary word into an analog quantity whose value is linearly related to the number of "1's" in the applied word. In turn, the analog quantity is applied via a gate circuit to control the operation of a pulse generator. As long as the analog quantity is derived from at least one input "1" signal, the gate circuit is energized and the pulse generator is enabled, whereby the generator increases the count of a binary counter. The digital output of the counter is translated by a second digital-to-analog converter into an analog quantity that is exactly representative of the count. This quantity is also applied to the gate circuit. When this second-mentioned analog quantity equals the analog quantity representative of the input "1" signals, the gate circuit is deenergized and the pulse generator is thereby disabled. At that point the state of the lowest-ordered stage of the counter is sensed by a gated output device. In accordance with the invention the state of the lowest-ordered stage is determinative of whether the parity of the applied binary word is odd or even.

It is a feature of the present invention that a parity checking circuit include circuitry for converting an input binary word to be checked into an analog quantity whose value is linearly related to the number of "1's" in the word.

It is a further feature of this invention that the noted analog quantity be applied via a gate circuit to control the operation of a pulse generator whose output is monitored by a binary counter.

It is a still further feature of the present invention that the output of the counter be translated by a second analog-to-digital converter into a second analog quantity whose value is exactly representative of the indication of the counter, and that the output of the second converter be also connected to the gate circuit, whereby the gate is deenergized and the generator thereby disabled when the two analog quantities are equal.

It is still another feature of this invention that, subsequent to the disablement of the generator, the state of the lowest-ordered stage of the counter is sensed by a device whose output indication is representative of the parity of the input binary word.

A complete understanding of the present invention and of the above and other objects, features and advantages thereof may be gained from a consideration of the following detailed description of an illustrative embodiment thereof presented hereinbelow in connection with the single figure of the accompanying drawing, which depicts a circuit that illustratively embodies the principles of this invention.

The illustrative embodiment shown in the drawing has associated therewith an input source 100 that includes bistable circuits 101 through 107 whose states are representative of a binary word the parity of which is to be checked. Assume that the input word has the value 0101010 or, in other terms, that the signals coupled from the bistable circuits 101 through 107 to AND devices 351 through 357, respectively, have the particular binary values indicated in the drawing. Assume further that the word 0101010 is applied to the input source 100 from information processing circuitry (not shown) in which an odd parity relationship had been established. The overall function of the circuit shown in detail in the drawing is to determine whether or not the word 0101010 is characterized by odd parity and, furthermore, to give a positive output indication of the results of that determination.

During a first interval of time, the bits of the word 0101010 supplied by the input source 100 are gated in parallel by a clock signal from a source 300 through the AND devices 351 through 357 to a digital-to-analog converter 110. In the specific example assumed herein, the input word includes seven bits. Therefore the converter 110 includes seven networks, each comprising two diodes and a resistor, each network being responsive to a different one of the applied bits. Thus, for example, the uppermost one of the networks included in the converter 110 includes diodes 111 and 112, a resistor 113 and, in addition, a positive source 114.

Illustratively, a relatively positive voltage level, for example +2 volts, is considered herein to be representative of a "1" input signal and a relatively negative voltage level, for example −0.5 volt, is considered representative of a "0" input signal. Thus, as long as the input signals appearing at the outputs of the AND devices 351 through 357 are all "0" signals, no current flows from the positive sources 114, 124, 134, 144, 154, 164 and 174 via the output lead 180 of the converter 110 to node point 185. Instead current flows from each source down through the resistor connected thereto and through the left-hand diode coupled to the associated AND device. Thus, for example, if a "0" signal voltage level appears at the output of the uppermost AND device 351, current flows from the source 114 down through the resistor 113 and through the diode 111, the diode 112 being back-biased, thereby to block current flow from the source 114 to the output node point 185.

Initially, that is, when the word 0000000 is applied to the converter 110, no current flows from the converter to the node point 185 and, in addition, as will be clear from the description presented hereinbelow, no current flows initially in lead 190 connected to the node point 185. As a result of these initial conditions, transistor 205 in gate circuit 200 is deenergized which, in turn, causes pulse generator 210 to be disabled, whereby no pulses are applied to 3-stage binary counter 230 to increase its count from an initial setting of 000. The "0" output leads 211, 212 and 213 of the three stages of the counter 230 are connected to a second digital-to-analog converter 220 whose output is connected via the lead 190 to the node point 185.

The converter 220 includes three networks each of which comprises two diodes and a resistor, each network being responsive to the signal appearing on a different one of the "0" output leads 211, 212 and 213. When the counter 230 represents the count 000, a relatively high positive voltage level appears on each of the leads 211, 212 and 213. As a result, current flows through the right-hand diode of each network and down through the resistor connected thereto, the left-hand diode of each network being back-biased, thereby to block current flow from the converter 220 to the node point 185.

When the counter 230 is in its 000 condition, the voltage appearing on the "1" output lead 214 of the $2^0$ or lowest-ordered stage 215 of the counter is relatively low in value, indicative of a "0" signal. Hence, whenever under these conditions the clock source 300 applies a relatively high or "1" gating signal to output AND device 250, there appears on lead 255 emanating from the device 250 a "0" output signal. A "0" output signal on the lead 255 is representative of the fact that the initial or quiescent input word (which, as stated above, is 0000000) is not characterized by odd parity.

Assume now that the input word 0101010 supplied by the source 100 is gated through the AND devices 351 through 357 by a first clock signal from the source 300 and thereby applied to the networks in the digital-to-analog converter 110. As noted above, each network which has a "0" signal applied thereto contributes no current to the node point 185. On the other hand, each network which has a "1" signal applied thereto contributes current to the node point 185. For example, consider the network including the diodes 121 and 122, the resistor 123 and the source 124. The value of the source 124 is chosen such that when the cathode of the diode 121 is at a relatively high voltage (representative of a "1" signal), the diode 121 is back-biased, whereby current flows from the source 124 through the resistor 123 and through the right-hand diode 122 to the node point 185. Each of the resistors 113, 123, 133, 143, 153, 163 and 173 has the same ohmic value. Therefore, each network which has a "1" signal applied thereto contributes one unit of current to the point 185 (this is the reason for designating the digital-to-analog converter 110 a *unitized* one).

Hence, in the specific example in which the word 0101010 is applied to the converter 110, three units of current (one for each input "1" signal) are applied via the lead 180 to the node point 185. As described above, the diodes 221, 231 and 241 of the converter 220 are initially back-biased. Hence, none of the current supplied to the node point 185 from the converter 110 is diverted via the lead 190 to the converter 220. Instead all of this current flows into the base of the transistor 205, thereby energizing the gate circuit 200. In this connection, it is important to note that the gate circuit 200 can be energized or maintained energized by the application thereto of only one unit of current.

When the gate circuit 200 is energized, the pulse generator 210 driven thereby is enabled, whereby a pulse appears at the output of the generator on lead 206 and is applied to the counter 230 to change the conditions of the stages 215, 216 and 217 thereof from "0," "0," "0" to "1," "0," "0," respectively. As a result, the potential on the "0" output lead 211 changes from a relatively high to a relatively low value, whereby the formerly conducting diode 222 now becomes back-biased and one unit of the current that had been supplied from the converter 110 to the gate circuit 200 is then diverted via the lead 190, the diode 221 and the resistor 223 (whose value is designated 4R) to bias source 224. Hence the value of the current applied to the gate circuit 200 is reduced to two units, which, however, is sufficient to maintain the transistor 205 energized.

After a period of time sufficient to ensure that the counter 230 and the converter 220 have completed their cycles of operation, the pulse generator 210 responds to the continued energization of the transistor 205 by supplying a second output pulse. This second pulse causes the stages 215, 216 and 217 of the counter 230 to switch from the states "1," "0," "0" to the states "0," "1," "0," respectively, whereby the diodes 221 and 241 are back-biased and the diode 231 is forward-biased. The current that is thereby diverted to the converter 220 via the lead 190 and the diode 231 has a value of two units, because the value of the resistor 233 is selected to be only one-half that of the value of the resistor 223 included in the uppermost network of the converter 220. Hence the net current applied to the gate circuit 200 is then three minus two or one unit, which is still sufficient to maintain the transistor 205 energized and the pulse generator 210 enabled.

The pulse generator 210 responds to the continued energization of the transistor 205 by supplying a third pulse to the binary counter 230, whereby the stages 215, 216 and 217 thereof switch to the states "1," "1," "0," respectively. Consequently, two paths, one including the resistor 223 and the other including the resistor 233, are thereby connected to the lead 190 for diverting current from the gate circuit 200. Together these two paths with their binary-weighted resistors divert to the converter 220 all three units of current supplied to the node point 185 from the converter 110. Hence the transistor 205 in the gate circuit 200 is thereby deenergized and the pulse generator 210 disabled.

When the stages 215, 216 and 217 of the binary counter 230 are representative of "1," "1," "0," respectively, the potential of the "1" output lead 214 of the lowest-ordered stage 215 is relatively high, indicative of a "1" signal. Hence, when, during a second interval of time, the source 300 supplies a clock signal to the AND device 250, the "1" signal on the lead 214 is gated through the device 250 to appear on the output lead 255. This "1" output signal is indicative of an odd parity condition of the input word 0101010.

Conversely, it is apparent that if an input word including an even number of "1's" is applied to the specific circuit shown in the drawing, the lowest-ordered stage 215 of the counter 230 would end up in its "0" state, whereby the potential on the "1" output lead 214 would then be relatively low, indicative of a "0" signal. This "0" signal would, in turn, combine with a "1" signal from the clock source 300 to provide a "0" output signal on the lead 255, indicative of the absence of odd parity in the applied input word.

Although emphasis herein has been directed to only a 7-bit input word, it is to be understood that the principles embodied in the illustrative circuit described herein can easily be extended to check an N-bit input word. In this connection it is noted that the number of stages included in the binary counter 230 is a function of the number of bits in the input word. More specifically, the counter must include sufficient stages to be able to represent an all-"1" input word. In the example presented hereinabove, the 7-bit input word might include seven "1" signals. To represent such an all-"1" word, a 3-stage binary counter is needed. The number $k$ of stages to be included in the counter is determined by the expression $2^k \geqq N$, where N is the number of digits in the input word. It is noted that the number of networks included in the converter 220 corresponds to the number of stages in the counter 230, the resistors included in the networks being suitably weighted in accordance with the principles set forth herein.

In the example above, the odd parity condition of an input word was checked. If it is desired to check the even parity condition of an input word and to provide a "1" signal representation on the output lead 255 as indicative of the existence of such a condition, it is possible to modify the circuit shown in the drawing simply by disconnecting the lead between the AND device 250 and the "1" output lead of the stage 215 and replacing it by a lead connecting the device 250 to the "0" output lead of the stage 215. Alternatively, the lead 214 can in such a case be replaced by a lead connecting the device 250 to the "1" output lead of the stage 216.

Specific circuit descriptions for the generator 210, the counter 230 and the sources 100 and 300 have not been given herein because their configurations are considered, in view of the end requirements therefor set forth above, to be clearly within the skill of the art.

Additionally, in the interest of simplicity and clarity of presentation, suitable means have not been described herein for controlling the bistable circuits in the input source 100 and for resetting the counter 230. Such auxiliary means are considered to be straightforward and easily implementable.

Additionally, it is to be understood that the above-described arrangements are only illustrative of the application of the principles of the present invention. Numerous other arrangements may be devised by those skilled in the art without departing from the spirit and scope of the invention.

What is claimed is:

1. In combination in a circuit for checking the parity of a binary word composed of digits which are respectively denoted by electrical signals each of which represents either a "0" or a "1," means responsive to said binary signals for providing a first discontinuous signal whose level is linearly dependent on the number of "1's" included in said word, binary counting means, generating means responsive to said first signal exhibiting a level representative of the presence of at least one "1" signal in said word for increasing the count of said counting means, and means connected to said generating means and to said counting means and responsive to the condition of said counting means for providing to said generating means a second discontinuous signal in opposition to said first signal, the level of said second signal being representative of the condition of said counting means, so that the count of said counting means is increased until the second signal representative thereof equals said first signal, at which point the count of said counting means is indicative of the number of "1's" in said binary word.

2. A combination as in claim 1 wherein said counting means includes a lowest-ordered stage, said combination further including output means responsive to the state of said stage for providing an indication of the parity of said binary word.

3. A combination as in claim 2 wherein said generating means comprises a gate circuit and a pulse generator responsive to the output of said gate circuit, the input of said gate circuit being connected to the outputs of said two discontinuous signal providing means, and the output of said pulse generator being connected to the input of said lowest-ordered stage.

4. A combination as in claim 3 wherein said means for providing said first signal includes a converter having therein as many networks as there are digits in the binary word to be checked, each network including two asymmetrically conducting diodes connected in series-opposition and a resistor connected to the junction of said diodes, all the resistors in said converter having the same ohmic value.

5. A combination as in claim 4 wherein the number $k$ of stages in said counting means is determined in accordance with the expression $2^k \geqq N$, where N is the number of digits in said word to be checked.

6. A combination as in claim 5 wherein said means for providing said second signal includes a converter having a plurality of networks respectively responsive to the stages in said counting means, each network including two asymmetrically connecting diodes connected in series-opposition and a resistor connected to the junction of said diodes, the value of each resistor being weighted in inverse relationship to the binary significance of the stage associated therewith.

7. A combination as in claim 6 further including means for gating said binary word to said first-mentioned converter and for subsequently gating said output means.

8. In combination in a system for checking the parity of a binary word composed of digits which are respectively denoted by electrical signals each of which represents either a "0" or a "1," first means responsive to said binary signals for providing a first discontinuous signal the number of units of whose magnitude corresponds to the number of "1's" in said word, binary counting means including a lowest-ordered stage, second means responsive to said first signal having a level of at least one unit for linearly increasing the count of said counting means, third means responsive to the count of said counting means for providing a second discontinuous signal whose level is linearly dependent on the count of said counting means, fourth means for applying said second signal to said second means in opposition to said first signal, so that when no net signal is applied to said second means the count of said counting means is representative of the number of "1's" in said word, and means responsive to the state of the lowest-ordered stage of said counting means for providing an output indication of the parity of said binary word.

References Cited by the Examiner

UNITED STATES PATENTS

| | | | |
|---|---|---|---|
| Re. 24,447 | 3/1958 | Block | 235—153 |
| 2,836,356 | 5/1958 | Forrest et al. | 235—154 |
| 3,021,063 | 2/1962 | Von Kummer | 235—153 |

ROBERT C. BAILEY, *Primary Examiner.*

MALCOLM A. MORRISON, *Examiner.*

S. SIMON, M. P. ALLEN, *Assistant Examiners.*